United States Patent [19]

Berndt et al.

[11] Patent Number: 5,371,754
[45] Date of Patent: Dec. 6, 1994

[54] LASER GYRO SINGLE TRANSFORMER POWER SUPPLY

[75] Inventors: Dale F. Berndt, Plymouth; Joseph E. Killpatrick, Minneapolis, both of Minn.

[73] Assignee: Honeywell Inc., Minneapolis, Minn.

[21] Appl. No.: 9,165

[22] Filed: Jan. 26, 1993

[51] Int. Cl.⁵ .............................. H01S 3/083
[52] U.S. Cl. ........................ 372/38; 372/69; 372/94; 356/350
[58] Field of Search ............ 372/38, 69, 94, 33, 372/32; 356/350; 315/291, 307

[56] References Cited

U.S. PATENT DOCUMENTS

| 4,994,953 | 2/1991 | Haak | 363/71 |
| 5,060,131 | 10/1991 | Sikora | 363/97 |
| 5,060,392 | 10/1991 | Grasso | 33/324 |
| 5,142,544 | 8/1992 | Donahue et al. | 372/38 |
| 5,216,683 | 6/1993 | Donahue | 372/38 |
| 5,299,211 | 3/1994 | Berndt et al. | 372/94 |

OTHER PUBLICATIONS

IEEE Plans 90 Position Location and Navigation Symposium Record, Las Vegas, USA, 20–23, Mar. 1990, pp. 543–548, G. L. Curran, et al.: "Ring Laser Gyro Applications for Tactical Missiles: The Army TACMS Solution" *pp. 545–546, paragraph Low Voltage Power Supply*.

Primary Examiner—Rodney B. Bovernick
Assistant Examiner—Hemang Sanghavi
Attorney, Agent, or Firm—Robert B. Leonard

[57] ABSTRACT

The invention provides a laser gyro with a single transformer power supply. The power supply receives a single 15 volt DC supply that is converted to a 320 volt DC supply, a 280 volt DC supply and a 500 volt DC supply. The invention implements a Royer Oscillator by providing a transformer with four windings each center-tapped. Two control transistors control the output of the transformer. The invention also provides a high speed output controlled start-up to prevent meta-stability in the Royer Oscillator.

14 Claims, 7 Drawing Sheets

0
LASER GYRO SINGLE TRANSFORMER POWER SUPPLY

This invention relates generally to laser gyros and, more particularly, to a method and apparatus for powering a laser gyro with a single transformer.

BACKGROUND OF THE INVENTION

Ring laser angular rate sensors, often also called ring laser gyros, are well known. One example of a ring laser angular rate sensor is U.S. Pat. No. 4,751,718 issued to Hanse, et al., which is incorporated herein by reference thereto. Present day ring laser angular rate sensors include a thermally and mechanically stable laser block having a plurality of interconnected formed cavities. Mirrors are placed at the extremities of the cavities for reflecting laser beams and providing an optical closed-looped path.

Prior art laser gyro power supplies incorporated at least four large external power supply transformers. These transformers included a start transformer at 2,500 VDC, a run transformer at 750 VDC, a dither transformer and a PLC transformer at 330 VDC.

It is the motive of the invention to provide a laser gyro incorporating a single power supply transformer.

SUMMARY OF THE INVENTION

The invention provides a laser gyro with a single transformer power supply. The power supply receives a single 15 volt DC supply that is converted to a 320 volt DC supply, a 280 volt DC supply and a 500 volt DC supply. The invention implements a Royer Oscillator by providing a transformer with four windings each center-tapped. Two control transistors control the output of the transformer. The invention also provides a high speed output controlled start-up to prevent meta-stability in the Royer Oscillator.

Other objects, features and advantages of the present invention will become apparent to those skilled in the art through the Description of the Preferred Embodiment, Claims, and drawings herein wherein like numerals refer to like elements.

DESCRIPTION OF THE PREFERRED EMBODIMENT

Figure 1:
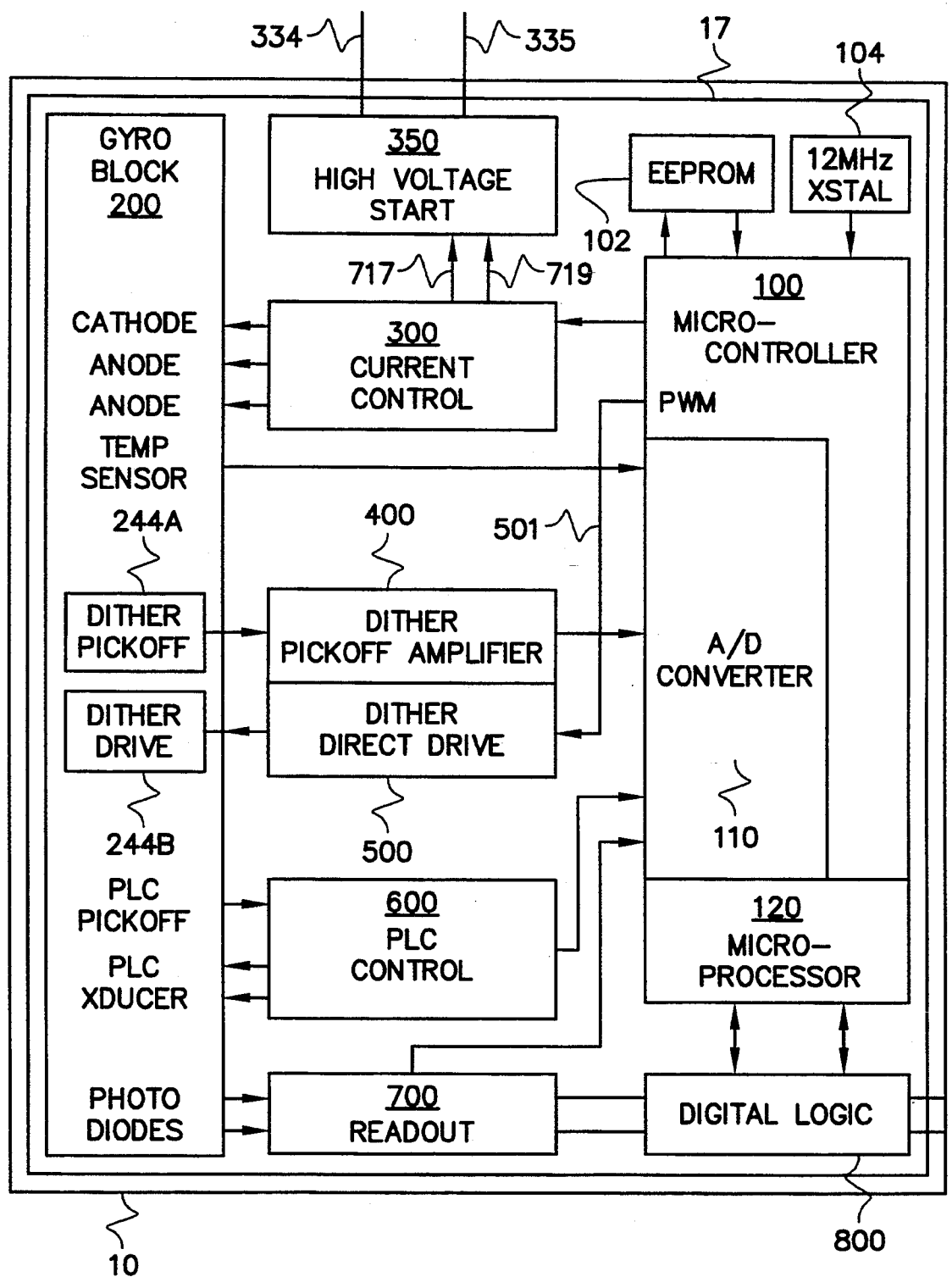
FIG. 1 shows a block diagram of one embodiment of a ring laser gyro employing the novel features of the present invention.

Referring now to FIG. 1, a schematic block diagram of one embodiment of a ring laser gyro employing the novel features of the present invention is shown. The present invention will be explained by way of example embodiments. Those skilled in the art having the benefit of this disclosure will appreciate that the examples herein are by way of illustration of the principals of the invention and not by way of limitation.

Ring laser gyro 10 includes a controller 100, a ring laser gyro block 200, an active current control 300, a dither pickoff amplifier 400, a direct digital dither drive 500, a path length control (PLC) device 600, a readout 700, and digital logic 800. The laser gyro 10 further comprises a high voltage start module 350 providing power to the laser block 200 and active current control 300.

Figure 2:
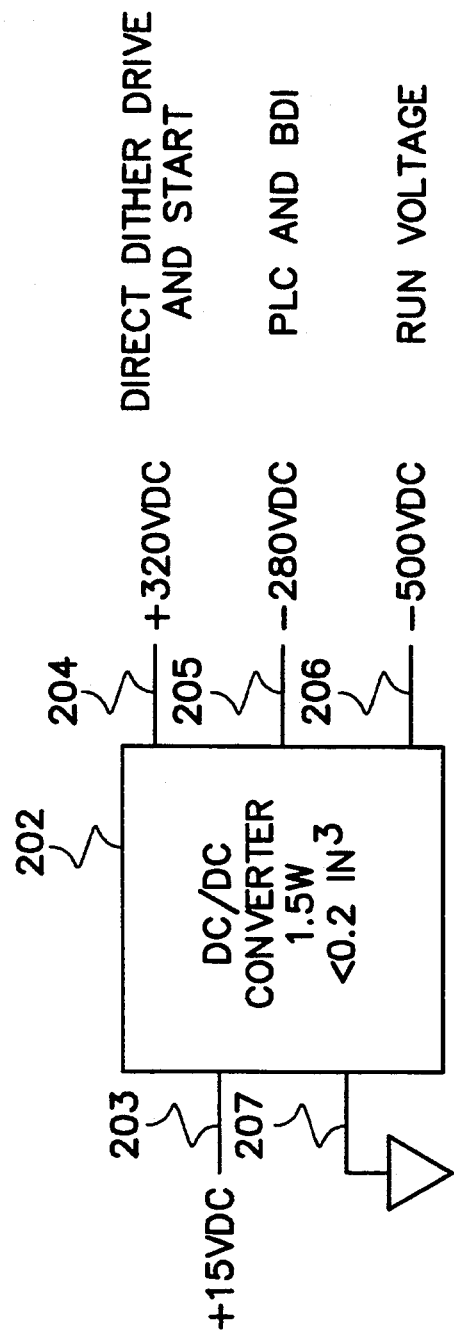
FIG. 2 schematically shows a block diagram of one example of the single transformer apparatus of the invention.

Now referring to FIG. 2 which shows a high level block diagram of the modular gyro power supply. The modular gyro power supply 202 receives power from a 15 volt DC supply 203. The modular gyro power supply comprises a DC/DC converter that has a power reading of 1.5 watts. The DC/DC converter occupies a volume of less than 0.2 in$^3$. The DC/DC converter is grounded through ground line 207. The output of the DC/DC converter 202 is three different DC voltages. A first dither drive and start voltage of 320 volts DC is provided on voltage power supply line 204. A second path length control and bias drift improvement power supply line is provided of 280 volts DC on voltage supply line 205. A third run voltage of 500 volts DC is provided on voltage supply line 206. The modular gyro power supply which is smaller than the control electronics provides a compact and efficient DC/DC converter power supply.

In summary, a single input voltage of +15 VDC produces three high output voltages:
1) +320 VDC for Direct Dither Drive and Start circuitry;
2) −280 V for Path Length Control and BDI or RDI;
3) −500 V for an active current control.

The total volume for the supply is less than 0.2 in$^3$. Total power consumption is 1.5 W.

Figure 3A:
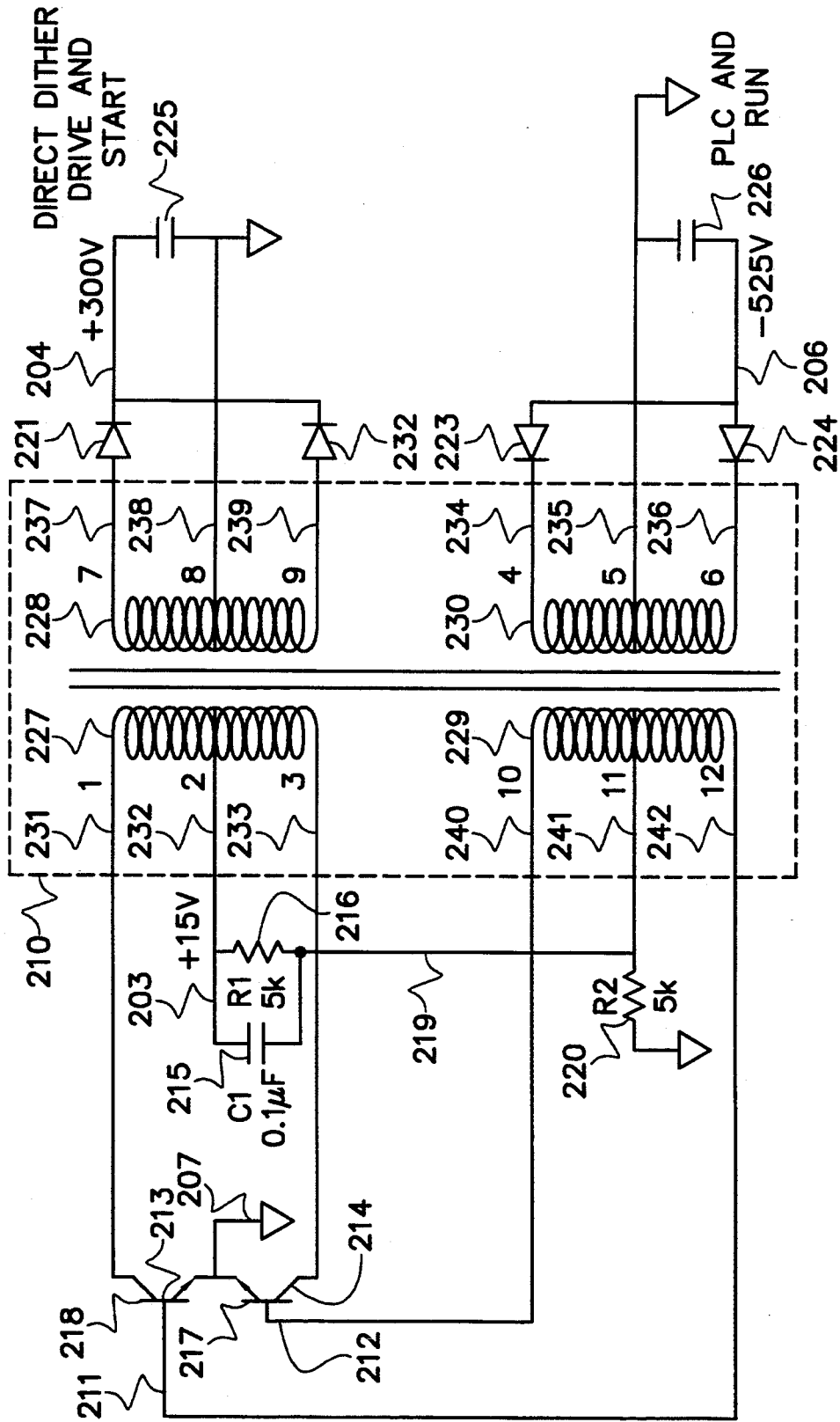
FIG. 3A schematically shows a detailed circuit diagram of one embodiment of a single transformer power supply as provided by one aspect of the invention.

Now referring to FIG. 3A which shows the power supply apparatus of the invention as a detailed circuit schematic. The laser gyro 10 of the invention uses one inexpensive small internal transformer 210. The single transformer 210 is used in a Royer Oscillator to obtain an efficient (80%) DC/DC converter.

Transformer 210 comprises four center-tapped windings. Winding 227 has a first terminal 231 attached to the collector of transistor 218. Transistor 218 has a base terminal 211 connected to the third terminal of center-tapped winding 229, terminal 242. The first winding 227 has a second center tap 232 connected to the 15 volt power supply 203. Capacitor C1 215 is connected across a resistor R1 216 which is also connected at one terminal to the 15 volt power supply 203. The third connection 233 of the winding 227 is connected to the collector of a second transistor 217 terminal 214 which has a common emitter configuration connected to ground 207 with transistor 218. The base of transistor 217, 212, is connected to the first terminal of winding 229, connection 240. The center tap of the second winding 229 is connected to ground through resistor R2 220. The terminal winding connection 241 is also connected to the other side of resistor R1 216 which in one preferred embodiment of the invention is 5K ohms along with R2 which is 5K ohms. The third winding 228 is connected to transformer diode 221 to provide a 300 volt power supply 204 to the direct dither drive and dither start 225. The center tap transformer 238 is connected to the other side of the direct dither drive 225. The output of the third winding 228 is terminal 239 which is also connected to the 300 volt supply 204. The fourth winding 230 provides a first winding connection 234 through diode 223 to provide a −525 volt supply to the path length controllers 226. A center tap of winding 230, center tap 235, is connected to the other side of the path length controller 226. The fourth winding 230 also has a second connection 236 connected through diode 224 to the −525 volt supply through line 206.

Figure 3B:
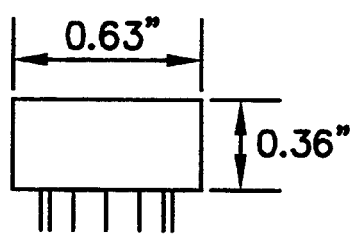
FIGS. 3B and 3C show side and top views respectively of the transformer.
Figure 3C:
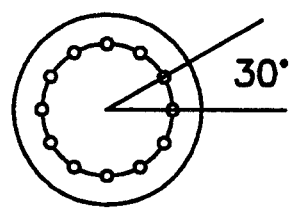

In one preferred embodiment of the invention shown in FIGS. 3B and C the wire size is 46 gauge. The footprint of the DC/DC converter transformer fits into a package. 0.63 inches by 0.36 inches where each external terminal is 30° from each other circularly around the canister.

Figure 4A:
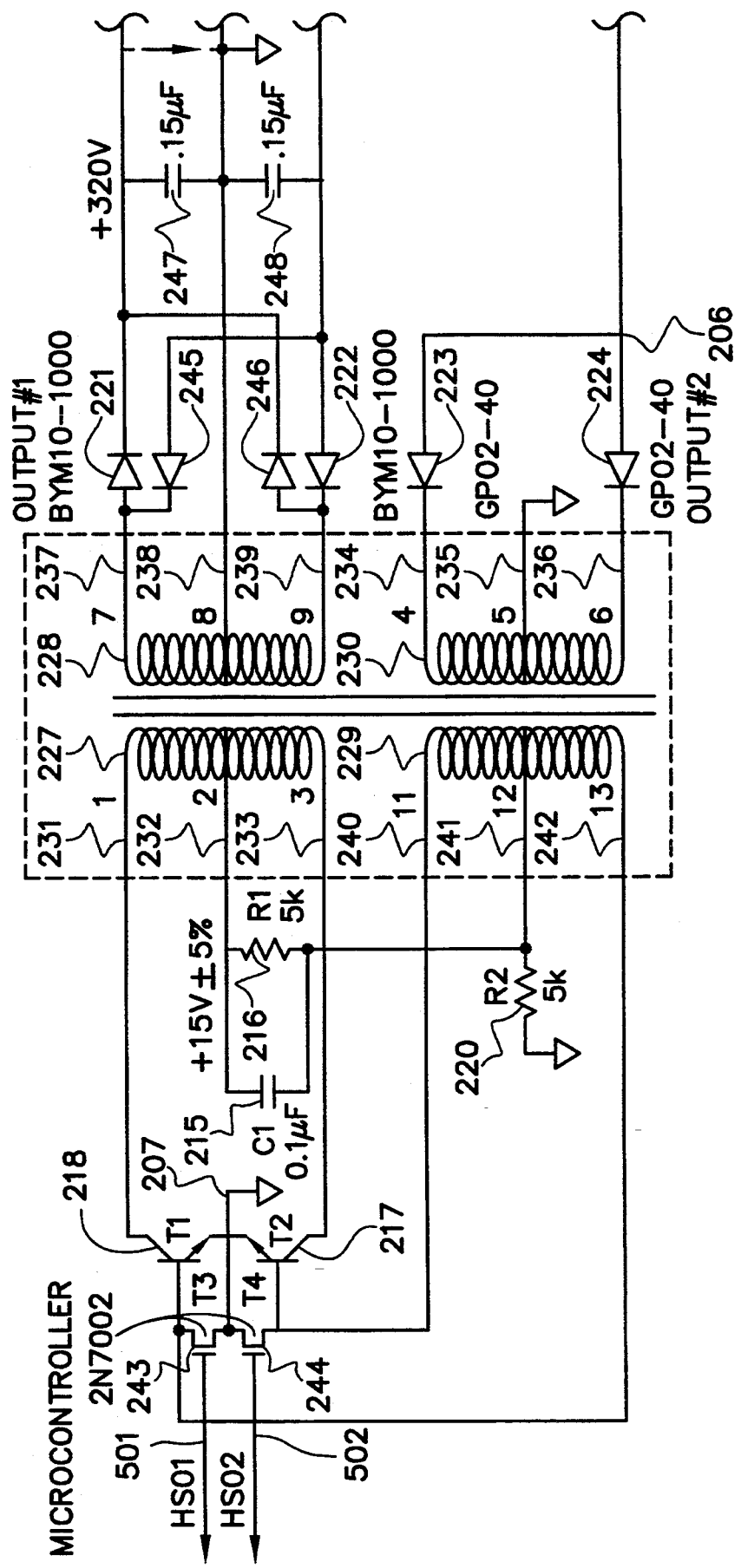
FIGS. 4A and 4B schematically show a detailed circuit diagram of one embodiment of a single transformer power supply as provided by an alternate aspect of the invention.
Figure 4B:
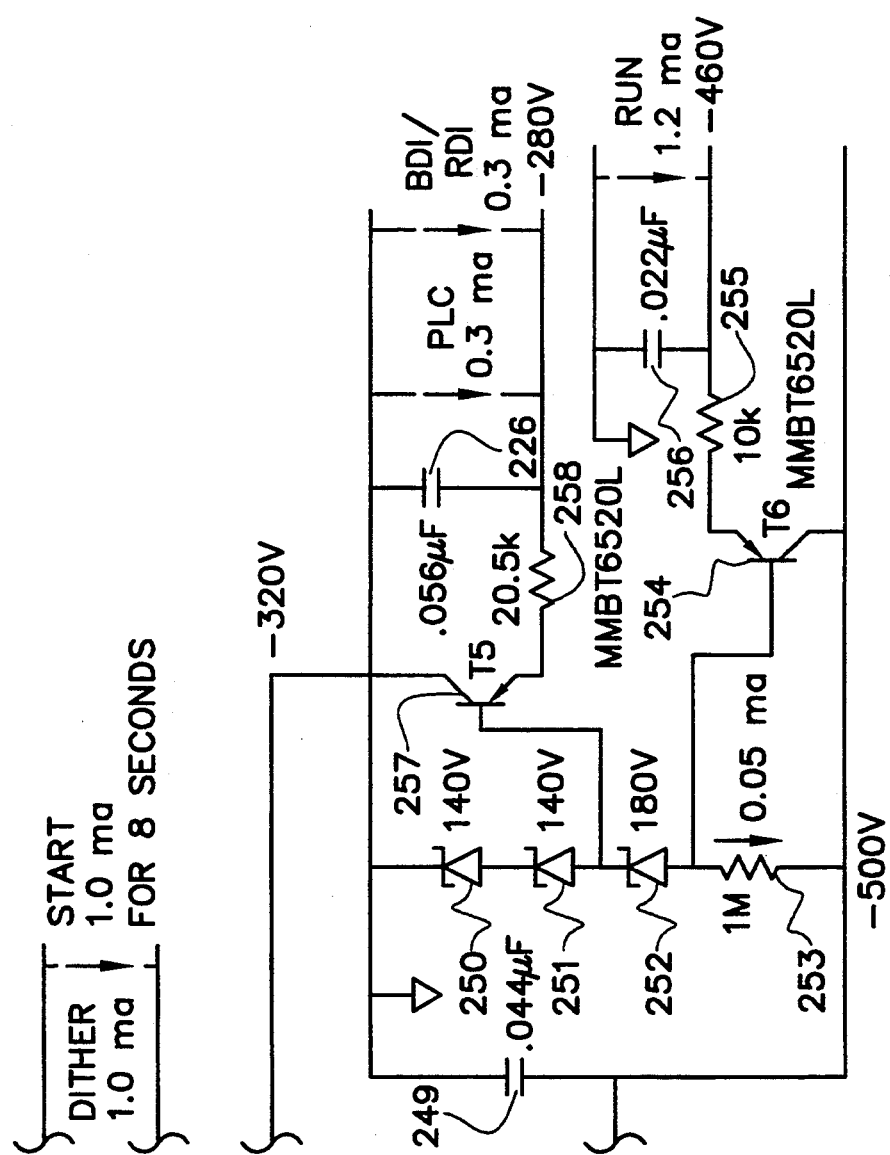

Now referring to FIGS. 4A and B which shows an alternate embodiment of the invention. The primary winding 1, 2, 3, feedback winding 11, 12, 13, and transistor T1 and T2 form the basic Royer Oscillator Circuit. Bipolar Transistors T1 and T2 are controlled by the microprocessor to guarantee a reliable start-up.

After start-up, T1 and T2 are turned off and are effectively out of the circuit. After start-up the circuit takes on all the advantages of the Royer Circuit. The self-oscillating frequency is automatically adjusted to optimize efficiency, avoiding deep saturation of the magnetic core, and reducing EMI radiation.

There are two secondary winds. One for ±320 V and the other for −500 V.

To reduce the number of Zener diodes a zener diode stack of 3 zeners are shared between the 2 secondary windings. 2×140 V give the −280 VDC while all 3 give −460 VDC.

T5 and T6 are series regulators.

At start-up T3 and T4 are turned on which turns off T1 and T2.

After a short time (1 ms.) T3 turns off $T=1/(2\ f)$ before T4 turns off. This assures that T1 turns on before T2 and avoids the meta-stability problems associated with the Royer Oscillator. Transformer 210 comprises four center-tapped windings. Winding 227 has a first terminal 231 attached to the collector of transistor 218. Transistor T1 218 has a base terminal 211 connected to the third terminal of center-tapped winding 229, terminal 242. The first winding 227 has a second center tap 232 connected to the 15 volt power supply 203. Capacitor C1 215 is connected across a resistor R1 216 which is also connected at one terminal to the 15 volt power supply 203. The third connection 233 of the winding 227 is connected to the collector of a second transistor 217 terminal 214 which has a common emitter configuration connected to ground 207 with transistor 218. The base of transistor 217, 212, is connected to the first terminal of winding 229, connection 240. The center tap of the second winding 229 is connected to ground through resistor R2 220. The terminal winding connection 241 is also connected to the other side of resistor R1 216 which in one preferred embodiment of the invention is 5K ohms along with R2 which is 5K ohms. The third winding 228 is connected to diode 221 to provide a 300 volt power supply 204 to the direct dither drive 225. The center tap transformer 238 is connected to the other side of the direct dither drive 225. The output of the third winding 228, terminal 239, is also connected to the 300 volt supply 204. The fourth winding 230 provides a first winding connection 234 through diode 223 to provide a −525 volt supply to the path length controllers 226. A center tap of winding 230, center tap 235, is connected to the other side of the path length controller 226. The fourth winding 230 also has a second connection 236 connected through diode 224 to the −525 volt supply through line 206.

Transistor T1 218 base is controlled by High Speed Output (HSO) 1 through FET switch 243 which is controlled from the microprocessor. The transistor T2 217 is controlled by a second FET switch 244 through (HSO) 2. The output of the third winding 228 is sent through a diode network to provide the dither motor and dither start circuit with power. The output of the −525 volt supply 206 is provided to a zener diode network. A current of 0.05 milliamps is provided through resistor 1M 253. A transistor T5 257 provides power to the BDI circuit of 280 volts through resistor 258. A path length controller current 0.3 milliamps is provided across the path length controller 226 of 0.056 $\mu f$. Transistor T6 254 provides a run current of 1.2 milliamps across capacitor 256 of 0.022 82 f through a resistor of 10K ohms 255 connected to the emitter of transistor T6 254.

Figure 5:
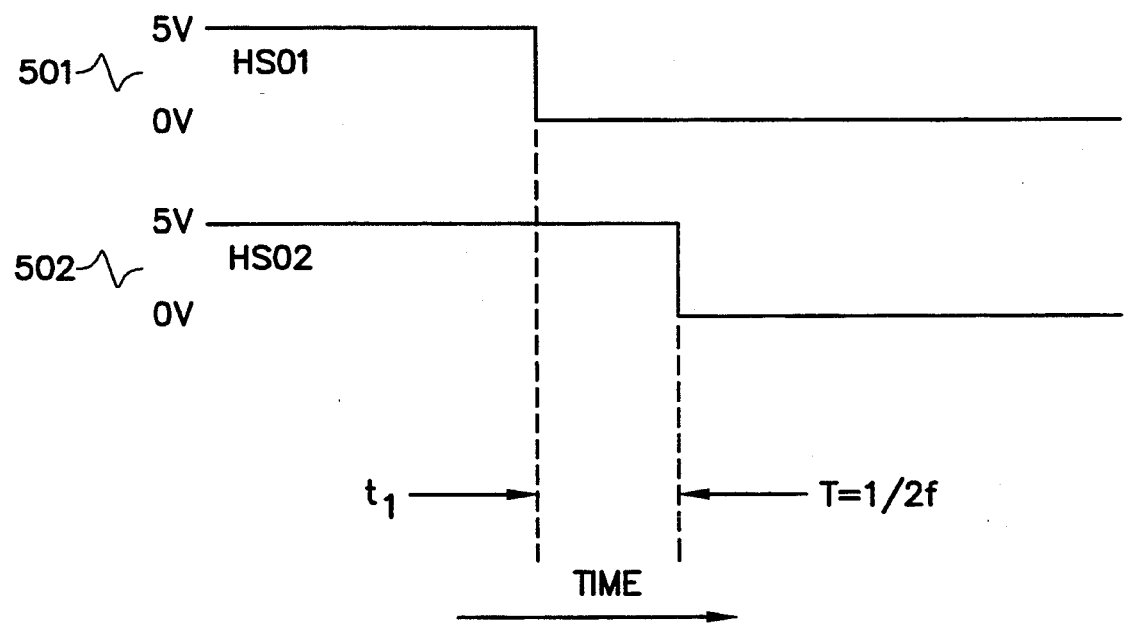
FIG. 5 shows a detailed timing diagram of the single transformer apparatus start sequence showing the microcontroller high speed output timing.

Now referring to FIG. 5 which shows the high speed output 1 and the high speed output 2 control lines. The timing diagram for the microcontroller high speed output provides a reliable start up of the DC/DC converter power supply. This prevents either of the control transistors from going into an undesirable state. HSO1 is provided high 5 volts for a certain period T1 at which time the HSO1 voltage is dropped to zero volts and HSO2 502 is provided 5 continuous volts until such time $T1+T$ exceeds $T1+1/(2\ f)$, f being the frequency of the power supply.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a laser gyro, a laser gyro supply apparatus comprising:
   (a) a DC voltage supply means having a voltage supply output; and
   (b) a DC to DC converter means connected to the voltage supply output to provide high voltage power supply output means, wherein said high voltage power supply output means comprises a 320 volt DC supply for supplying voltage to a direct dither drive and a starting circuitry, a −280 volt DC supply for supplying voltage to a path length control, and a −500 volt DC supply for supplying voltage to an active current control.

2. The laser gyro of claim 1 wherein the laser gyro further includes control electronics and wherein the laser gyro power supply apparatus has a small size compared to the control electronics.

3. In a laser gyro, a laser gyro power supply apparatus comprising:
   (a) a first switching means having a first emitter connected to a ground, a first base and a first collector;

(b) a second switching means having a second base, second emitter connected to a ground and a second collector;

(c) a first capacitor means connected to a first voltage supply means in parallel with a first resistor means connected to ground through a second resistor means;

(d) a first low voltage transformer winding having a first winding connection, a second center-tapped connection and a third winding connection wherein the first winding connection is connected to the first collector means, the second center-tapped connection is connected to the first voltage supply means and the third winding connection is connected to the second collector;

(e) a second transformer winding having a fourth winding connection connected to the second base, a fifth center tap connection connected to the first capacitor means and first resistor means, and a sixth winding connection connected to the first base;

(f) a first high powered transformer winding having a seventh winding connection to a first diode means to provide a first high voltage output, an eighth center tap output and a ninth winding output connected through a second diode means to the high voltage output; and (g) a second high powered transformer winding with a tenth winding output connected through a third diode means to provide a second high powered output having an eleventh center tap winding output and a twelfth winding output connected through a fourth diode means to the second high powered output.

4. The laser gyro power supply apparatus of claim 3 further including a direct dither drive motor having a direct dither drive power supply input connected to the first high voltage output.

5. The laser gyro power supply apparatus of claim 3 further including a path length control driving apparatus having a path length control power supply input connected to the output of the second high power output.

6. The laser gyro power supply apparatus of claim 3 further including a means for disabling the first switching means.

7. The laser gyro power supply apparatus of claim 6 further including a means for controlling the means for disabling the first switching means.

8. The laser gyro power supply apparatus of claim 6 wherein the means for disabling the first switching means comprises a field effect transistor.

9. The laser gyro power supply apparatus of claim 8 further including a high speed output controller signal connected to the gate of the field effect transistor.

10. The laser gyro power supply apparatus of claim 3 further including a means for disabling the second switching means.

11. The laser gyro power supply apparatus of claim 10 further including a means for controlling the means for disabling the second switching means.

12. The laser gyro power supply apparatus of claim 10 wherein the means for disabling the second switching means comprises a field effect transistor.

13. The laser gyro power supply apparatus of claim 12 further including a high speed output controller signal connected to the gate of the field effect transistor.

14. The laser gyro of claim 3 wherein the laser gyro further includes control electronics and wherein the laser gyro power supply apparatus has a small size compared to the control electronics.

* * * * *